US009440257B2

(12) United States Patent
Braun et al.

(10) Patent No.: US 9,440,257 B2
(45) Date of Patent: Sep. 13, 2016

(54) METHOD OF COATING AN ELEMENT WITH GLUE

(71) Applicant: Kronotec AG, Lucerne (CH)

(72) Inventors: Roger Braun, Willisau LU (CH); Alfred Waldmuller, Vinningen (DE)

(73) Assignee: Kronotec AG, Lucerne (CH)

( * ) Notice: Subject to any disclaimer, the term of this patent is extended or adjusted under 35 U.S.C. 154(b) by 0 days.

(21) Appl. No.: 13/875,347

(22) Filed: May 2, 2013

(65) Prior Publication Data

US 2013/0243950 A1 Sep. 19, 2013

Related U.S. Application Data

(62) Division of application No. 10/537,366, filed on Sep. 1, 2005, now Pat. No. 8,453,411.

(51) Int. Cl.
*B05D 5/10* (2006.01)
*C09J 5/00* (2006.01)

(52) U.S. Cl.
CPC .. *B05D 5/10* (2013.01); *C09J 5/00* (2013.01); *C09J 2400/303* (2013.01)

(58) Field of Classification Search
CPC ................ B05D 5/10; C09J 5/04; C09J 5/06
USPC ............. 427/207.1, 208, 208.2, 208.4, 208.6
See application file for complete search history.

(56) References Cited

U.S. PATENT DOCUMENTS 4,240,938 A 12/1980 Kraft et al.
4,980,404 A 12/1990 Aydin et al.
6,440,259 B1 * 8/2002 Patel ............................ 156/332
6,462,050 B1 10/2002 Isaacs et al.
7,037,024 B2 5/2006 Steinwender
8,117,795 B2 2/2012 Knauseder
2001/0021431 A1 * 9/2001 Chen .................. B29C 47/0028 428/54
2002/0148551 A1 10/2002 Knauseder
2003/0024199 A1 2/2003 Pervan et al.
2004/0031226 A1 2/2004 Miller et al.
2006/0010818 A1 * 1/2006 Knauseder ...................... 52/581

FOREIGN PATENT DOCUMENTS

DE 19547864 6/1997
DE 10212324 10/2003
GB 2377457 1/2003

* cited by examiner

*Primary Examiner* — Xiao Zhao
(74) *Attorney, Agent, or Firm* — Bachman & LaPointe, PC

(57) ABSTRACT

The invention relates to a method for producing a glue-coated element, to the glue-coated element, to an adhesive compound and to a method for producing glue-coated derived timber panels, as well as to panels produced according to the method. The method for producing a glue-coated element that can be glued with other similarly glue-coated elements, comprises the steps of applying a one-component adhesive to at least one surface section of the element and drying the applied one-component adhesive. According to a preferred embodiment of the invention, draw-out resistance elements are provided on the glue-covered element.

17 Claims, 2 Drawing Sheets

6
14
12
6
30
20
26
2
18
32
24
16
4
10
28
34
22
10
8
8

METHOD OF COATING AN ELEMENT WITH GLUE

CROSS REFERENCE TO RELATED APPLICATION

This application is a divisional application of application Ser. No. 10/537,366, filed Jun. 1, 2005.

BACKGROUND OF THE INVENTION (1) Field of the Invention

The present invention relates to a method of manufacturing a glue-coated element, to the glue-coated element, an adhesive compound, and to a method of producing glue-coated derived-timber panels, and to panels produced with this method.

(2) Prior Art

Adhesives and the corresponding adhesive compounds can be classified into four categories. First, adhesives which are applied wet, i.e. in an aqueous medium or solved in a solvent, to the element(s) to be glued. The elements to be bonded are glue-coated, joined and fixed with the aid of auxiliary means, for example, by cramps or clamps in the predetermined position during the period of time which the glue takes to set by the removal of water or solvent or by a chemical reaction, and the glue bond is established. It usually takes a few hours for the glue to set. The application of the glue is carried out immediately before joining the elements.

Second, adhesives are known which consist of two components interacting with one another. A first component is applied to the element(s) to be joined, and dried as necessary, so that an adhesive film is formed. This adhesive film is then activated by adding the second component, such as by adding small amounts of water. The second component can be applied either immediately before processing, or it can be a component part of the adhesive film, for example in the form of micro capsules, but spatially separated from the first component. Typical examples of these technologies are described in WO 01/94721; WO 02/063114 and DE 102 12 324.

Third, adhesives are known which are applied as a film to the elements to be bonded and which are then softened without the addition of further components, but by the prolonged exposure to high temperatures and/or pressures, and which set again when cooled down and thus form a bond between the elements. These are adhesives which are usually industrially used, since their processing conditions with respect to the temperature and pressure are to be precisely adhered to. These adhesives are processed in the factory, up to the point where the adhesive has completely set.

Fourth, adhesives are known which have a sticky surface in a dry condition and which form a bond when a contact is established without the application of high pressures. Since the adhesive force of these adhesives is weak, the adhesive bonds are usually separable. In GB 2 377 457, such an pressure-sensitive adhesive is suggested for bonding two panels. The film, formed by one pressure-sensitive adhesive is soft and permanently sticky, however, which means that it loses its function, for example, when dust settles on it. The weak cohesive forces which a pressure-sensitive adhesive film develops, cause the elements bonded by means of a pressure-sensitive adhesive to easily come apart, even when they are only slightly stressed. The minimal adhesive force and the inevitable clogging of the adhesive film brought about by simple dust, make it unsuitable for industrial use, where the adhesive bond has to have at least a minimum strength.

Summarizing, it can be said that adhesives which have to establish a permanent bond are applied either immediately in connection with the joining of the bond or need the addition of a second component or the application of high pressures and/or temperatures. An adhesive which can be applied to the elements to be glued together and which results in a strong, durable bond at a period of time remote from the application and without the addition of a second component or the application of high pressures and/or temperatures is not known.

SUMMARY OF THE INVENTION

An adhesive, as referred to in the following, will refer to all types of glues, adhesives and the like, on the basis of natural or synthetic materials, which are suitable to establish an adhesive bond and, being one-component adhesives, do not need a second substance to activate the adhesive.

It is an object of the present invention to provide an element which is easy to join by gluing. It is another object of the present invention to provide a method of manufacturing such an element and an adhesive bond which is easy to produce.

The method of the present invention relates to the manufacture of a glue-coated element which can be glued to another element which was glue-coated in the same way, comprising the steps of:

- applying a one-component adhesive on at least one surface section of the element, and
- reducing the liquid content of the applied one-component adhesive up to the point of moisture content equilibrium.

According to the present invention, the adhesive is a one-component adhesive which is preferably applied in the form of a dispersion, the moisture content of which is reduced, however, until the moisture content equilibrium is reached. The dry adhesive film thus produced on the surface of the glue-coated element may continue to feel a bit sticky to the touch, it forms a film, however, which does not contain any surplus moisture. The adhesive film is essentially block-free at room temperature, and therefore not prone to clogging with dust. The element which is thus at least partially glue-coated can be manipulated, e.g. cut to size, packaged or otherwise processed, without the glue-coated section being a hindrance or the adhesive force of the dried adhesive film deteriorating.

An adhesive bond is effected by joining two of these adhesive films, and thus the corresponding glue-coated elements. To do this, it is not necessary to observe a period of applying high pressures and/or temperatures. All that needs to be done is to apply a pressure which can easily be manually exerted in order to overcome a static friction (to be described below in more detail) of the adhesive films. It is quite obvious that this method enables the creation of an adhesive bond which can be independent in time and space from the application of the adhesive. It is therefore particularly suitable for glue-coating elements in the factory which are then joined by the consumer at a desired mounting location.

The characteristics of the adhesive bond, in particular the strength of the bond between two glue-coated elements to be joined at a later time can be optimized amongst others by selecting the film hardness which the adhesive has after application. A film hardness which according to the DIN specification 53157 is measured at a pendulum hardness according to König of about 10 to about 80 pendulum oscillations, preferably with a film hardness about 20 to about 40 pendulum oscillations, most preferably with a film hardness of about 25 to about 35 pendulum oscillations, has been found to be particularly suitable to establish the desired strength of the adhesive bond.

It is common knowledge for a person skilled in the art that viscosity, film hardness, glass transition temperature, solids content, processing conditions and the other adhesive properties mentioned in the context of the present invention can be set relatively independently from each other, for example, by selecting and combining the suitable raw materials and additives.

The adhesive applied to the element preferably has a glass transition temperature of 0° C. to 30° C., preferably of about 10° C. to about 20° C. It has been found that this kind of adhesive, after it is applied and dried, establishes a strong adhesive bond even after a longer period of time, when this adhesive film is combined with a second, identical adhesive film.

It has also been found to be advantageous for the applied adhesive to have an elongation at tear of about 200% to about 1200%, preferably of about 300% to about 1000%, particularly advantageously of about 400% to about 900%. This is sufficient to achieve the desired level of shearing and tensile strength.

Preferably, one-component adhesives are used for the method according to the present invention, which are selected from a group comprising polyacrylates, polyurethanes and polyvinyl acetates, particularly preferably polyvinyl ethylene copolymers. The one-component adhesive can also be a mixture of the substances mentioned above.

The adhesive used to carry out the method and to be applied to the element is normally used as a dispersion, preferably as an aqueous dispersion. This is to ensure that no organic solvents are used for the application. The exhalation of organic solvents is therefore eliminated when the glue-coated elements are joined at a later time.

Since the adhesive used is dried on the at least partially glue-coated element, the applied one-component adhesive should have a solids content which is as high as possible so that during the drying process only a minimal amount of moisture has to be removed. Thus the one-component adhesive advantageously has a solids content of at least about 30% by weight, preferably more than about 40% by weight, particularly advantageously more than about 45% by weight.

The viscosity of the adhesive is important on the one hand for its rheology and therefore, for example, for processing the one-component adhesive. On the other hand, the properties of the later adhesive bond can be influenced by the viscosity. Preferably, a one-component adhesive is used having a viscosity of at least about 2000 mPas, preferably of at least about 3000 mPas, particularly advantageously of at least about 6000 mPas, advantageously of more than 8000 mPas.

The applied amount of the one-component adhesive can vary to a large degree. It is to be expected that an adhesive layer of up to about 250 g/m$^2$ is the economic upper limit of the application of the method. Usually an adhesive layer of up to about 150 g/m$^2$ is applied, wherein, of course, an economical application of adhesive is preferred, so that the preferred amount to be applied is between about 80 g/m$^2$ and about 120 g/m$^2$.

The one-component adhesive is provided with means to adjust its viscosity, depending on the conditions of use of the finished glue bond. In particular, dispersing agents, wetting agents, antifoaming agents, thickeners or stabilizers, or a mixture of the agents mentioned above, serve to adjust the rheology desired for processing or the later adhesive bond, and to maintain it until the one-component adhesive is processed. The adjustment of the rheology is one of the measures which is quite common. It is preferred for the adhesive dispersion to have a viscosity which is independent of shearing, so that the viscosity does not change during processing.

The additives optionally added also include agents to prevent or delay the oxidation of the adhesives or the adhesive components. These oxidation inhibitors, known per se, extend the period of time, up to which, with the adhesives in question, the applied and dried adhesive film establishes an adhesive bond with an identical film.

The one-component adhesive applied to the element to be glue-coated can also contain bactericides and/or fungicides, for example, to stabilize the adhesive compound in damp rooms or in outdoor areas.

It is deemed to be a particular advantage of the present invention that the adhesive used for glue-coating the element has a processing temperature of about 10° C., particularly advantageously of about 15° C. to about 30° C. It is therefore not necessary to air condition the environment in which the adhesive is applied.

The drying of the adhesive on the at least partially glue-coated element is usually carried out in such a way that the moisture or solvent content of the one-component adhesive dispersion is reduced until the moisture content equilibrium is reached. The moisture content equilibrium is the content of moisture in the adhesive which adjusts itself to the surrounding climatic conditions, i.e. depending on the temperature and the air moisture. The moisture content is preferably reduced by applying the adhesive on a hygroscopic material, in particular derived timber, which absorbs the surplus moisture. Often the reduction of the moisture content is accelerated by drying the adhesive, until the moisture content equilibrium is reached. This can be done either by the application of heat or by ventilating. These two measures can also be combined. The acceleration of the drying process can be necessary, in particular when the material or the surface on which the adhesive is applied, is not or not sufficiently hygroscopic.

For economical reasons the drying of the at least partially glue-coated surface can be carried out while the element is further processed, or cut to size at the sections not glue-coated and/or while the element is being packaged. Since the drying process can be quickly carried out, in particular when the adhesive has a high solids content, a particular cost advantage is inherent in the method according to the present invention.

It has come as a surprise that, in some cases after drying, the surface of the adhesive film has a particularly high static friction. If the two surfaces of the adhesive films which are to join the two elements come into contact with one another, this high static friction immediately has the effect that separating the two elements by parallel displacement, for example, when they are pulled apart, can only be carried out by the application of a certain, usually manual, force. The static friction is preferably at least about 1 N/mm$^2$, preferably more than about 2 N/mm$^2$, particularly advantageously more than about 4 N/mm$^2$.

The adhesive bond is created by joining two elements, each coated with an identical adhesive film dried up to the point of moisture content equilibrium, wherein after about 48 hours, preferably after about 24 hours, particularly advantageously after about 12 hours, the two adhesive films cease to be distinguishable as films which are associated with the individual elements. After the above-mentioned period of time, the two adhesive films have merged into a uniform adhesive layer between the elements to be bonded.

According to a preferred embodiment of the present invention, the adhesive bond is created by first having two adjacent adhesive films exert a certain static friction on each other, which is in the order of the above-mentioned values. This static friction, which is quite sufficient for initially fixing the elements in position with one another, is later overlapped and enhanced by the establishment of the uniform adhesive layer. The strength of the adhesive layer is preferably about 1.5 $N/mm^2$, advantageously at least about 2.5 $N/mm^2$, particularly advantageously at least about 4 $N/mm^2$. The adhesive layer is preferably created by merging the two adjacent adhesive films, wherein it must be noted that they are relatively high-viscosity products which only form a homogeneous layer after a certain amount of time. However, as soon as the surfaces of the adhesive films begin to merge, an adhesive bond of considerable strength is established.

Particularly preferred is a one-component adhesive which has reached at least about 30%, advantageously at least about 40%, particularly advantageously about 50% of the maximum possible strength of the adhesive bond only about 5 minutes after the two elements to be bonded have been joined.

Preferably, an adhesive is used having its properties, in particular its rheology, adjusted such that the adhesive force of the one-component adhesive, with respect to the original adhesive force immediately after application and drying, is only reduced by about 20%, if the element having the dried adhesive film applied on it is stored over a period of up to three months, at a moisture content of at least 6% by weight, at temperatures of about −20° C. to about +50° C.

An adhesive which has been shown to have particular ease of processing when applied to the elements to be joined, is an adhesive which, with respect to the adhesive force immediately after application and drying, has an adhesive force which is only reduced by about 60%, preferably by up to about 40%, particularly advantageously by up to about 20%, when the element having the dried adhesive film applied on it is stored for up to three months at an air moisture of about 5% to about 95%.

A one-component adhesive which establishes a water-proof adhesive bond has been shown to be particularly suitable in its application. It is already advantageous when the water-proof adhesive is applied below the top surface, for example on a tongue-and-groove joint, since in this way water is prevented from seeping under or behind water-sensitive materials, in particular derived timber panels. It is preferred, however, for the adhesive to be applied immediately in the area of the surface. This prevents, for example, water from intruding into the middle layer of the derived timbers below the surface, and therefore avoids the undesirable swelling of the derived timbers.

The configuration of the adhesive bond and the level of strength of the adhesive bond can be improved when the elements to be bonded are provided with a profile at their edges which after joining causes a certain pressure to be exerted on the adhesive bond. For example, a tongue-and-groove profile is suitable, wherein the tongue is received in a nonpositive engagement in the groove of the corresponding element. To improve the level of strength, a comparatively light pressure of at least 0.1 $N/mm^2$, preferably of 0.8 $N/mm^2$ to 2 $N/mm^2$, maximally of 5 $N/mm^2$ is sufficient. A higher pressure is not suitable if the profiled elements are to be manually joined, since otherwise the pressure to be applied would be too high.

A particularly suitable application of the method described above is the glue-coating of derived timber panels in the factory. The following explanations are understood as a description of an independent inventive step which should be protected in its own right.

The derived timber panels are planar products which, depending on their purpose of use, are intended to be joined in a composite structure. Typical fields of use are floor, wall and ceiling panels. The panels generally have an upper surface fulfilling both technical and decorative requirements, an underside and edges. Often the edges have been prepared in the factory in such a way that the individual panels can be joined in a positive and/or non-positive engagement. The panels on offer today are mostly derived timber, but panels of solid wood are also available in some cases. Since the products are quite similar in the way they are to be processed, the term “derived timber” is always meant also to refer to “solid wood”. Minerally bonded chip or particle boards are therefore also covered by the generic term of derived timber.

Known connections are based either on purely mechanical plug-in, clamped or snap joints, as necessary, using separate joining means. Alternatively, connections are known which use adhesives and which are applied either on site when the composite structure is created or in the factory when the panels are cut to size.

Adhesives are known which are applied in an inactive state and are then activated before or as the panels are being joined, so that they react and establish the desired strong bond between the panels. They therefore belong in the second group of adhesives initially described.

The application of the adhesive in the factory is described, for example, in the German utility model publication No. DE 297 03 962 of WITEX AG. Herein, the application of a contact adhesive in the factory is described as part of the prior art, which is applied on a tongue-and-groove profile. The adhesive is applied to the profile and activated by the application of pressure or heat. An example of a suitable adhesive is not mentioned, which is why it is not possible to implement the teachings of the WITEX publication.

The application of a two-component adhesive on profiled edges of a panel and the activation of the two components, i.e. the transition from a passive to an active state, is described in WO 01/94721 to M. Kaindl Holzindustrie. According to the description in the Kaindl patent, the adhesive is activated on site by the addition of water, for example, by brush-applying the water. In WO 02/063114 to Fritz Egger GmbH & Co, it is explained that the application of an adhesive which is enclosed in micro-capsules is carried out in the factory. When the panels are joined together, the micro-capsules are destroyed and the adhesive is thus activated.

The activation of the adhesive is either associated with highly complex measures which ensure above all that the adhesive remains in an inactive state. The manufacture and processing of micro-capsules is thus not only highly complex and expensive, but its practical application has not yet been satisfactorily solved. Or the activation is also a potential source of faults, such as when a liquid is necessary for activation. Derived timbers are sensitive to water which makes the material swell, and organic solvents are not without risk to the consumer. To apply the right amount of liquid is not easy if the activation has to be done with water. The usual consumer, who often installs the products himself, is likely to use too much of the solvent. This means that too much water is applied carrying the risk that the edge areas of the panels are soaked and begin to swell.

It is therefore another object of the present invention to provide derived timber panels which are easy to join, and a method of manufacturing the same.

This object is solved by a method having the features of claim 25, and by a derived timber panel having the features of claim 31.

Since the activation of an adhesive has the above-mentioned problems, it has been found that a one-component adhesive is particularly suitable for the preparation of panels in the factory. With respect to the properties of the one-component adhesive and with respect to the application and drying of the adhesive, reference is made to the above explanations which are easily applicable to glue-coating and processing derived timbers.

The adhesive is applied at least in a step-wise manner. The amount and the surface area to be glue-coated at the edges can be easily derived from the adhesive force or tensile strength desired, which the adhesive bond is to have and from the strength potential of the adhesive. If necessary, the form of the glue-coated sections of the panels to be bonded is to be taken into consideration. After the adhesive force has fully developed, as a rule, the two glued panels when exposed to a tensile, shearing or bending force, should not break within the adhesive joint but within the derived timber.

In the most basic case, the edges can be formed as straight side surfaces of the derived timber panel. However, profiling the edges, for example by simple notching or a tongue-and-groove joint are preferred. The profiling has the effect that not simply vertical surfaces are adjacent to one another, because angled or planar surface are created between the top and bottom surfaces, which are not adjacent to the top surface of the panel.

If an adhesive is applied to these surfaces, there is less risk that as the panels are joined, the adhesive is pushed out at the top surface of the panel and that the top surface of the panel is visually degraded by seeped-out adhesive. Moreover, the profiled edges can contribute to the rapid development of the tensile strength in that the adhesive layers are brought into a particularly good and complete contact with each other when the panels are joined. It can be advantageous for the profiled edges to have larger contacting surfaces which can be used to apply the adhesive, but this is not always necessary for adhesives with a high strength potential.

According to an advantageous embodiment of the method, the adhesive is applied in an aqueous phase. This makes a wide variety of conventional application methods possible, such as spraying with nozzles, application with a brush, dipping or rolling.

The moisture content of the adhesive is reduced after application until the moisture content equilibrium has been reached. After the moisture content equilibrium has been reached, a dry adhesive surface is present, which while feeling a little sticky to the touch does not really affect the handling of the panel. It is particularly preferred to dry the panels in their packaging, i.e. without separate drying processes or drying storage facilities. It is quite obvious that the transfer of the glue-coated panels immediately into shelf-ready packaging without intermediate drying processes, such as with hot air nozzles, is particularly economical.

With respect to the installation properties for both wood and derived timbers, as well as for other materials, an adhesive is preferred which establishes a holding force or static friction or tensile strength as quickly as possible, thereby making it possible to use the installed panels. This is important, for example, to be able to walk on a floor space which is made of joined panels. An adhesive which, 5 minutes after joining two panels or two adhesive layers, reaches about 30%, advantageously about 50%, particularly advantageously about 70% of its maximum strength, has been shown to be particularly suitable. The strength which is reached after 5 minutes should allow the floor to be walked upon.

It is deemed an independent contribution to the present invention that the glue-coated element according to claim 1, which is provided with profiled edges at least partially coated with an adhesive, has additional mechanical draw-out resistance elements, in particular, barbs or positively engaging profiled sections.

To ensure that the adhesive bond can already be stressed to a high degree immediately after joining and before the maximum adhesive force of the adhesive bond has been established, it is suggested that mechanical draw-out resistance elements are included in the tongue or in the groove.

These mechanical draw-out resistance elements can be formed as pins, discs or bands, preferably of metal, but also of plastic material. They are preferably inclined in the direction in which the tongue is moved when it is inserted into the groove, i.e. when the elements are joined. If immediately after joining a force is exerted on the groove and on the tongue which would cause the joint to be slipped apart, these mechanical draw-out resistance elements prevent such a movement. The draw-out resistance elements can be substantially weaker than the usual locking means, since the adhesive bond of the present invention has a high static friction already immediately after joining.

According to a particularly advantageous embodiment, a draw-out resistance element is configured as a positively engaging profile section. Preferably, this profiled section has at least one recess and a corresponding protrusion, wherein the engagement height does not, however, exceed the layer thickness of the applied adhesive, usually 0.05 mm to 0.3 mm, preferably 0.1 to 0.2 mm.

It can be seen that a profile having such small dimensions is not suitable to fully withstand a force which is directed to drawing the profile apart. The profile of such small dimensions not exceeding the layer thickness of the applied adhesive is suitable, however, to close the strength differential between the initial draw-out resistance of the adhesive bond and the desired draw-out resistance. If no adhesive has been applied and if the elements are joined by a tongue and a groove, the profile of small dimensions between the tongue and the groove do not come into engagement.

BRIEF DESCRIPTION OF THE DRAWINGS

An exemplary embodiment explains details of the present invention with reference to the drawings, in which.

DETAILED DESCRIPTION OF THE PREFERRED EMBODIMENT(S)

Figure 1:
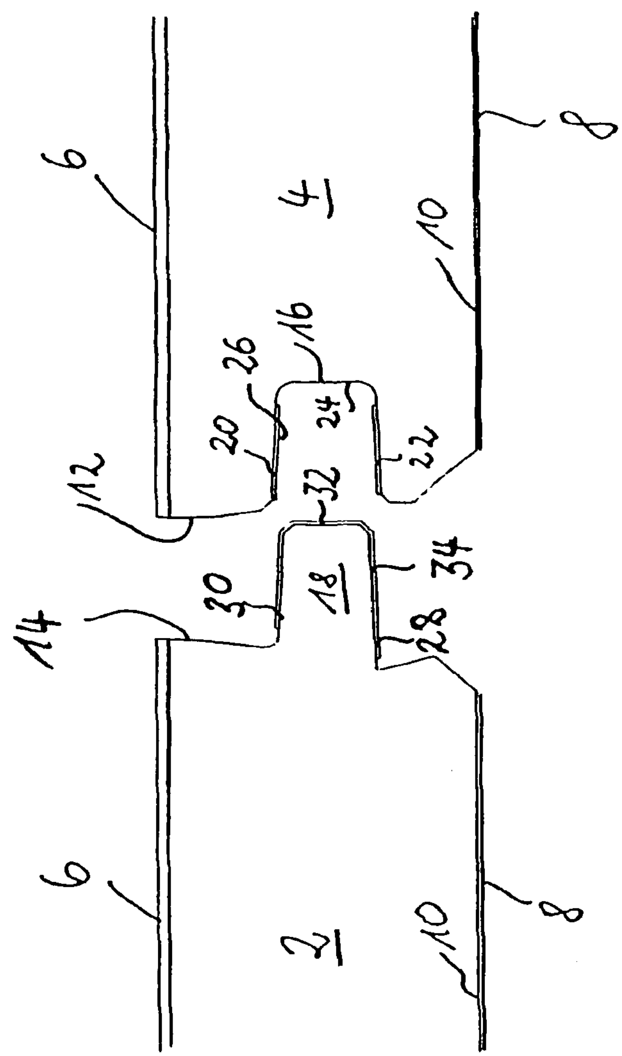
FIG. 1 shows a first embodiment of the present invention.

A chip board of medium density (MDF board) is divided up in panels 2, 4. Each panel 2, 4 has a decorative laminated top surface 6 and a bottom surface 10 provided with a counteracting layer 8. The edges 12, 14 are provided with a groove 16 or with a tongue 18 corresponding to the groove 16. A panel 2 has a groove 16 at its first edge 12 and, on a second edge 14 which extends in parallel to the first edge 12, a tongue 18 corresponding to the groove 16. This means that a plurality of panels 2, 4 can be joined to form a continuous surface.

The groove 16 has two surfaces 20, 22 which are approximately parallel and extend from a groove bottom 24 to the edge 12. An adhesive layer 26 is applied to the parallel surfaces 20, 22. The tongue 18 has two approximately parallel surfaces 28, 30 extending from the edge 14 to a tongue end 32. The tongue 18 is dimensioned such that it positively engages the groove 16 when the panels 2, 4 are joined together. The surfaces 28, 30 of the tongue 18 are provided with an adhesive layer 34.

The panels 2, 4 with the glue-coated surfaces 20, 22, 28, 30 are aligned in such a way that the groove 16 and the tongue 18 face each other. The panels 2, 4 are then joined together so that the surfaces 20, 28 and 22, 30 are adjacent to each other. The adhesive layers 26 and 34 are thus also brought into contact with one another.

To implement the method according to the present invention, a commercial aqueous dispersion of a polyvinyl acetate ethylene copolymer (PVA cE) is used. This dispersion is used with a solids content of 50% by weight. Further, 1% by weight of a thickener and 0.5% by weight each of a biocide and of an antifoaming agent are used. Finally, the dispersion to be applied also contains 1% by weight of an oxidization stabilizer. The water content of the dispersion is 47% by weight. The dispersion has a glass transition temperature Tg of 17° C. and an elongation at tear of about 700%.

The dispersion is sprayed onto the surfaces 20, 22, 28, 30 at room temperature. The applied adhesive layer is at about 150 $g/m^2$. The glue-coated surfaces 20, 22, 28, 30 are guided past hot air nozzles to dry the adhesive film to the point of moisture content equilibrium within a few minutes. The glass transition temperature and the elongation at tear remain exactly the same for the dried adhesive film as for the dispersion.

Figure 2:
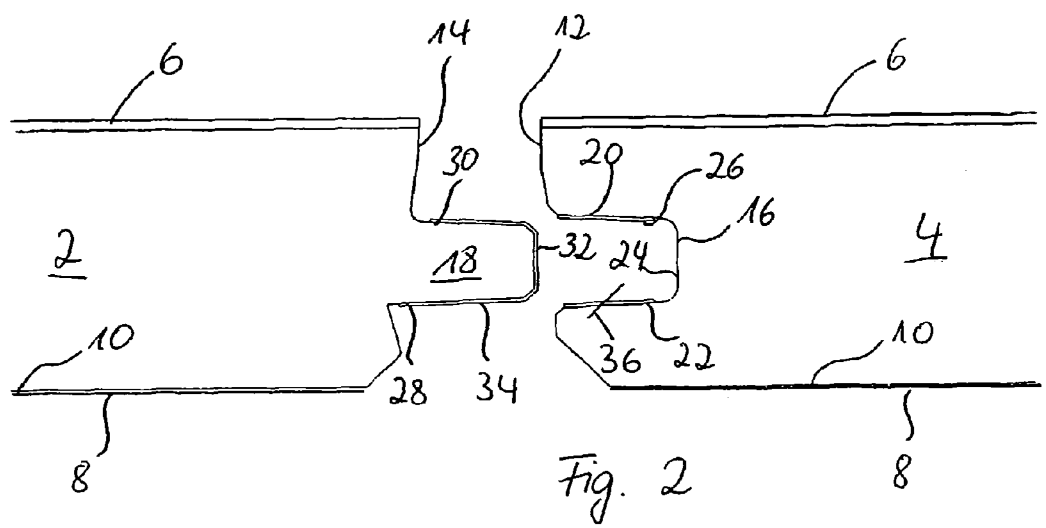
FIG. 2 shows a second embodiment of the present invention with a draw-out resistance element.

FIG. 2 shows the edge areas of two panels 2, 4. The edge 12 of the panel 2 is provided with a groove 16, the edge 14 of the panel 4 is provided with a tongue 18. The groove 16 and the tongue 18 are partially glue-coated. The thickness of the adhesive layer is 0.1 mm. In the glue-coated state the groove 16 and the tongue 18 are in non-positive engagement. In the bottom side wall of the groove, a draw-out resistance element, in the present case a wire pin 36, is inserted extending through the bottom surface 22 of the groove 16. The wire pin 36 is inclined. The inclination of the wire pin 36 is in the direction of the movement of the tongue 18 when it is inserted into the groove 16.

When the panels 2, 4 are joined, the wire pin 36 does not necessarily penetrate the tongue 18. If, however, a force is applied to the panels 2, 4, which would result in the tongue 18 being withdrawn from the groove 16, this is prevented on the one hand by the static friction of the adhesive which is effective already immediately after joining, and on the other hand, if stress is exerted in this direction, the wire pin 36 penetrates the tongue 18 and prevents withdrawal of the panels 2, 4.

Figure 3:
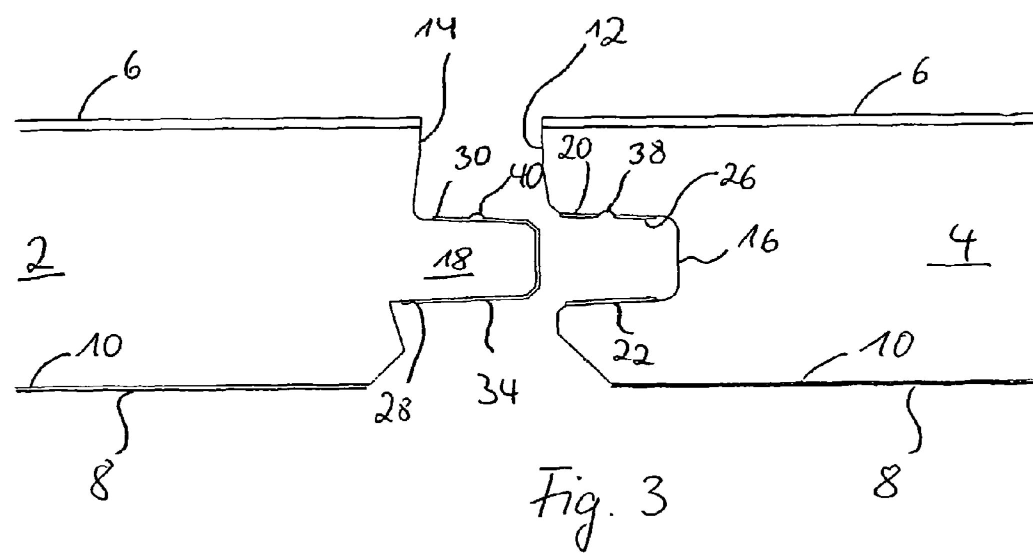
FIG. 3 shows a third embodiment of the present invention with a draw-out resistance element.

FIG. 3 shows an alternative embodiment of a profile with a draw-out resistance element. The panels 2, 4 are essentially formed as shown in FIGS. 1 and 2. Unlike the embodiments described above, there is no wire pin 36 provided as a draw-out resistance element. However, a recess 38 has been machined in the top surface 20 of the groove 16 corresponding to half of the thickness of the adhesive layer, i.e. 0.05 mm. On the corresponding surface of the tongue 18 which, after joining, is adjacent to the surface 22, a protrusion 40 of the same height as the recess is machined. In FIG. 3, the recess 38 and the protrusion 40 are shown in greatly enlarged form in order to illustrate the principle of the draw-out resistance element.

When the panels 2, 4 are joined, the protrusion 40 engages the recess 38, simply by displacing the adhesive film. Neither the groove 16 nor the tongue 18 are offset. If a force is applied to the panels 2, 4 which would result in the tongue 18 being withdrawn from the groove 16, this is prevented on the one hand by the static friction of the adhesive, which is present immediately after joining, and on the other hand, the engagement of the recess 38 and the protrusion 40 prevents the panels 2, 4 from being drawn apart in this direction of stress.

The invention claimed is:

1. A method of manufacturing glue-coated elements which are ultimately to be glued together to form a panel, comprising the steps of:

providing a plurality of panel elements comprising at least a first panel element and a second panel element, each panel element having a profiled edge for engaging with another panel element, wherein the plurality of panel elements define the panel when engaged with each other; wherein the profiled edge comprises a tongue on the first panel element and a groove on the second panel element, wherein the tongue and the groove engage each other when the first and second panel elements are engaged with each other; and a mechanical draw-out resistance element on at least one of the tongue and the groove, wherein the tongue and the groove have substantially parallel surfaces, and wherein the draw-out resistance element comprises a separate element extending from one of the tongue and the groove toward the other of the tongue and the groove and angled in a direction of insertion of the other of the tongue and the groove relative to the one;

applying a one-component adhesive to at least a portion of the profiled edge; and before the elements are joined together, reducing moisture content of the adhesive on the elements to a point of moisture content equilibrium to form a dried adhesive film on the profiled edges such that, when the elements are joined, dried adhesive films on the profiled edges of the elements bond together and wherein the mechanical draw-out resistance element comprises positively engaging sections defined on the tongue and the groove, wherein the positively engaging sections have a height less than the thickness of the film.

2. The method according to claim 1, further comprising the step of joining the dried adhesive films of the elements together at a location remote from the providing and applying steps.

3. The method according to claim 1, further comprising the step of placing the mechanical draw-out resistance element on the at least one of the tongue and the groove before or after the step of applying the one-component adhesive.

4. The method according to claim 1, wherein said glue-coated element comprises timber panels each having a top surface, a bottom surface and edges, and wherein said one-component adhesive is applied on at least two edges of each panel.

5. The method according to claim 1, further comprising profiling edges of elements to be bonded, wherein said profiling step comprises machining profiles of the edges of the elements to be bonded as corresponding profiles to be joined when the elements are bonded.

6. The method according to claim 5, wherein said machining step comprises machining the profiles of the edges of the elements to be bonded in such a way that in a joined state they apply a pressure of at least 0.1 $N/mm^2$ to 5 $N/mm^2$ on each other.

7. The method according to claim 6, wherein said machining step forms edge profiles in such a way that in the joined state they apply a pressure of 0.8 $N/mm^2$ to 2 $N/mm^2$ on each other.

8. The method according to claim 1, wherein said applying step applies the one-component adhesive which, when joined to a corresponding adhesive, establishes an adhesive force of at least 1 $N/mm^2$.

9. The method according to claim 8, wherein said adhesive force is at least 2 $N/mm^2$.

10. The method according to claim 8, wherein said adhesive force is more than 4 $N/mm^2$.

11. The method according to claim 1, wherein said one-component adhesive is an adhesive which, when bonded to a corresponding adhesive film, reaches a maximum adhesive force by 48 hours.

12. The method according to claim 11, wherein said maximum adhesive force is reached by 24 hours.

13. The method according to claim 11, wherein said maximum adhesive force is reached by 12 hours.

14. The method according to claim 1, wherein said moisture content reducing step comprises drying the adhesive to the point of moisture content equilibrium in a package of at least one derived timber board.

15. The method according to claim 1, wherein said one-component adhesive is an adhesive which reaches at least about 30% of its maximum tensile strength 5 minutes after being joined with a corresponding adhesive layer.

16. The method according to claim 1, wherein said one-component adhesive is an adhesive which reaches at least about 50% of its maximum tensile strength 5 minutes after being joined with a corresponding adhesive layer.

17. The method according to claim 1, wherein said one-component adhesive is an adhesive which reaches at least about 70% of its maximum tensile strength 5 minutes after being joined with a corresponding adhesive layer.

* * * * *

UNITED STATES PATENT AND TRADEMARK OFFICE

CERTIFICATE OF CORRECTION

PATENT NO. : 9,440,257 B2
APPLICATION NO. : 13/875347
DATED : September 13, 2016
INVENTOR(S) : Roger Braun et al.

It is certified that error appears in the above-identified patent and that said Letters Patent is hereby corrected as shown below:

On the Title Page

Item [30], insert:
--Foreign Application Priority Data
Dec. 2, 2002 (DE).............................. 102 56 384
Apr. 17, 2003 (DE).............................. 103 18 093--

Signed and Sealed this
Twenty-sixth Day of September, 2017

Joseph Matal

Joseph Matal
*Performing the Functions and Duties of the*
*Under Secretary of Commerce for Intellectual Property and*
*Director of the United States Patent and Trademark Office*